United States Patent
Maes et al.

(10) Patent No.: US 8,401,022 B2
(45) Date of Patent: Mar. 19, 2013

(54) PRAGMATIC APPROACHES TO IMS

(75) Inventors: Stéphane H. Maes, Fremont, CA (US); Induprakas Kodukula, Menlo Park, CA (US); Richard Guy Hallett, Melksham (GB)

(73) Assignee: Oracle International Corporation, Redwood Shores, CA (US)

( * ) Notice: Subject to any disclaimer, the term of this patent is extended or adjusted under 35 U.S.C. 154(b) by 124 days.

(21) Appl. No.: 12/364,642

(22) Filed: Feb. 3, 2009

(65) Prior Publication Data

US 2009/0201917 A1 Aug. 13, 2009

Related U.S. Application Data

(60) Provisional application No. 61/027,157, filed on Feb. 8, 2008.

(51) Int. Cl.
*H04L 12/28* (2006.01)
*H04J 3/16* (2006.01)
*H04J 3/22* (2006.01)
*H04L 12/66* (2006.01)

(52) U.S. Cl. ............... 370/395.5; 370/466; 370/467; 370/356

(58) Field of Classification Search .............. None
See application file for complete search history.

(56) References Cited

U.S. PATENT DOCUMENTS

| | | |
|---|---|---|
| 5,414,812 A | 5/1995 | Filip et al. |
| 5,613,060 A | 3/1997 | Britton et al. |
| 5,699,513 A | 12/1997 | Feigen et al. |
| 5,786,770 A | 7/1998 | Thompson |
| 5,850,517 A | 12/1998 | Verkler et al. |
| 5,867,665 A | 2/1999 | Butman et al. |
| 5,946,634 A | 8/1999 | Korpela |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |

(Continued)

FOREIGN PATENT DOCUMENTS

| | | |
|---|---|---|
| EP | 2 034 748 A1 | 3/2009 |
| WO | WO 2007134468 A1 | 11/2007 |

OTHER PUBLICATIONS

U.S. Appl. No. 11/024,160, filed Dec. 2004, Maes.

(Continued)

*Primary Examiner* — Ayaz Sheikh
*Assistant Examiner* — Sori Aga
(74) *Attorney, Agent, or Firm* — Kilpatrick Townsend & Stockton LLP

(57) ABSTRACT

Embodiments of the invention provide systems and methods for providing services such as provided by Internet Protocol (IP) Multimedia Subsystem (IMS) with an IP network that is not the IMS. According to one embodiment, a system for providing communication services can comprise a communication network, one or more subsystems communicatively coupled with the network and adapted to provide one or more telco functions, and one or more applications communicatively coupled with the network and adapted to utilize the telco functions.

39 Claims, 7 Drawing Sheets

U.S. PATENT DOCUMENTS

| | | |
|---|---|---|
| 6,578,159 B1 | 6/2003 | Kitagawa et al. |
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,868,413 B1 | 3/2005 | Grindrod et al. |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,073,055 B1 | 7/2006 | Freed et al. |
| 7,089,317 B2 | 8/2006 | Jeyaraman et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,676,813 B2 | 3/2010 | Bisset et al. |
| 7,716,310 B2 | 5/2010 | Foti |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,925,727 B2 | 4/2011 | Sullivan et al. |
| 8,023,971 B2 | 9/2011 | Egli |
| 8,032,920 B2 | 10/2011 | Maes |
| 8,068,860 B1 | 11/2011 | Midkiff |
| 8,073,810 B2 | 12/2011 | Maes |
| 8,090,848 B2 | 1/2012 | Maes |
| 8,161,171 B2 | 4/2012 | Maes |
| 8,214,503 B2 | 7/2012 | Maes |
| 8,230,449 B2 | 7/2012 | Maes |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benatar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1* | 5/2006 | Adamczyk et al. ........... 370/466 |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0061397 A1 | 3/2007 | Gregorat et al. |
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |

| | | | |
|---|---|---|---|
| 2007/0118618 A1 | 5/2007 | Kisel et al. | |
| 2007/0118662 A1 | 5/2007 | Vishwanathan et al. | |
| 2007/0150480 A1* | 6/2007 | Hwang et al. | 707/10 |
| 2007/0150936 A1 | 6/2007 | Maes | |
| 2007/0182541 A1 | 8/2007 | Harris et al. | |
| 2007/0192374 A1 | 8/2007 | Abnous et al. | |
| 2007/0192465 A1 | 8/2007 | Modarressi | |
| 2007/0197227 A1 | 8/2007 | Naqvi et al. | |
| 2007/0201376 A1 | 8/2007 | Marshall-Wilson | |
| 2007/0203841 A1 | 8/2007 | Maes | |
| 2007/0204017 A1 | 8/2007 | Maes | |
| 2007/0223462 A1* | 9/2007 | Hite et al. | 370/356 |
| 2007/0233883 A1 | 10/2007 | De Lutiis et al. | |
| 2007/0239866 A1 | 10/2007 | Cox et al. | |
| 2007/0271554 A1 | 11/2007 | Fletcher et al. | |
| 2007/0276907 A1 | 11/2007 | Maes | |
| 2007/0280226 A1 | 12/2007 | Sonalkar et al. | |
| 2007/0291859 A1 | 12/2007 | Maes | |
| 2008/0013533 A1* | 1/2008 | Bogineni et al. | 370/389 |
| 2008/0025243 A1 | 1/2008 | Corneille et al. | |
| 2008/0037747 A1 | 2/2008 | Tucker | |
| 2008/0080479 A1 | 4/2008 | Maes | |
| 2008/0109853 A1 | 5/2008 | Einarsson et al. | |
| 2008/0126541 A1 | 5/2008 | Rosenberg et al. | |
| 2008/0127232 A1* | 5/2008 | Langen et al. | 719/328 |
| 2008/0151768 A1 | 6/2008 | Liu | |
| 2008/0151918 A1 | 6/2008 | Foti | |
| 2008/0162637 A1 | 7/2008 | Adamczyk et al. | |
| 2008/0168523 A1 | 7/2008 | Ansari et al. | |
| 2008/0175357 A1 | 7/2008 | Tucker | |
| 2008/0186845 A1 | 8/2008 | Maes | |
| 2008/0189401 A1 | 8/2008 | Maes | |
| 2008/0201705 A1 | 8/2008 | Wookey | |
| 2008/0228919 A1 | 9/2008 | Doshi et al. | |
| 2008/0232567 A1 | 9/2008 | Maes | |
| 2008/0235230 A1 | 9/2008 | Maes | |
| 2008/0235327 A1 | 9/2008 | Maes et al. | |
| 2008/0235354 A1 | 9/2008 | Maes | |
| 2008/0235380 A1 | 9/2008 | Maes | |
| 2008/0275883 A1* | 11/2008 | Ashraf et al. | 707/10 |
| 2008/0281607 A1 | 11/2008 | Sajja et al. | |
| 2008/0288966 A1 | 11/2008 | Maes | |
| 2008/0301135 A1 | 12/2008 | Alves et al. | |
| 2008/0307108 A1 | 12/2008 | Yan et al. | |
| 2009/0006360 A1 | 1/2009 | Liao et al. | |
| 2009/0015433 A1 | 1/2009 | James et al. | |
| 2009/0034426 A1 | 2/2009 | Luft et al. | |
| 2009/0112875 A1 | 4/2009 | Maes | |
| 2009/0119303 A1 | 5/2009 | Rio et al. | |
| 2009/0125595 A1 | 5/2009 | Maes | |
| 2009/0132717 A1 | 5/2009 | Maes | |
| 2009/0187919 A1 | 7/2009 | Maes | |
| 2009/0190603 A1* | 7/2009 | Damola et al. | 370/401 |
| 2009/0193057 A1 | 7/2009 | Maes | |
| 2009/0193433 A1 | 7/2009 | Maes | |
| 2009/0222541 A1 | 9/2009 | Monga et al. | |
| 2009/0228584 A1 | 9/2009 | Maes et al. | |
| 2009/0306834 A1 | 12/2009 | Hjelm et al. | |
| 2009/0328051 A1 | 12/2009 | Maes | |
| 2010/0049640 A1 | 2/2010 | Maes | |
| 2010/0049826 A1 | 2/2010 | Maes | |
| 2010/0058436 A1 | 3/2010 | Maes | |
| 2010/0070447 A1 | 3/2010 | Pfuntner et al. | |
| 2010/0077082 A1 | 3/2010 | Hession et al. | |
| 2010/0083285 A1 | 4/2010 | Bahat et al. | |
| 2010/0185772 A1 | 7/2010 | Wang et al. | |
| 2010/0192004 A1 | 7/2010 | Bauchot et al. | |
| 2011/0125909 A1 | 5/2011 | Maes | |
| 2011/0125913 A1 | 5/2011 | Maes | |
| 2011/0126261 A1 | 5/2011 | Maes | |
| 2011/0134804 A1 | 6/2011 | Maes | |
| 2011/0142211 A1 | 6/2011 | Maes | |
| 2011/0145278 A1 | 6/2011 | Maes | |
| 2011/0145347 A1 | 6/2011 | Maes | |
| 2011/0182205 A1 | 7/2011 | Gerdes et al. | |
| 2011/0258619 A1 | 10/2011 | Wookey | |
| 2012/0045040 A1 | 2/2012 | Maes | |
| 2012/0047506 A1 | 2/2012 | Maes | |
| 2012/0173745 A1 | 7/2012 | Maes | |

OTHER PUBLICATIONS

Andrews, Tony et al, Business Process Execution Language for Web Services, Version 1.1, BEA Systems, International Business Machines Corporation, SAP AG, Siebel Systems, May 5, 2003, 31 pages.

Liberty Architecture Overview, Liberty Alliance Project Version 1.1, Piscataway New Jersey, Jan. 15, 2003, 44 pages.

Maes, Stephanie, Multi-modal Web IBM Position W3C/WAP Workshop, IBM Research Human Language Technologies, downloaded http://www.w3.org on May 26, 2003, 9 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Simpson et al, Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm on May 26, 2003, 5 Pages.

Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Thomas Manes, Anne, "Registering a Web Service in UDDI", 2003.

U.S. Appl. No. 11/848,347, filed Aug. 31, 2007, Office Action mailed Oct. 29, 2009, 12 pages.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Office Action mailed Feb. 24, 2010, 12 pages.

U.S. Appl. No. 11/943,101, filed Nov. 20, 2007, Advisory Action mailed Apr. 16, 2010, 3 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Office Action mailed Jul. 8, 2009, 9 pages.

U.S. Appl. No. 11/951,500, filed Dec. 6, 2007, Final Office Action mailed Mar. 30, 2010, 26 pages.

U.S. Appl. No. 11/951,500, filed Dec. 6, 2007, Office Action mailed Sep. 22, 2009, 24 pages.

U.S. Appl. No. 12/019,299, filed Jan. 24, 2008, Office Action mailed Mar. 31, 2010, 13 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 11/070,317, filed Mar. 1, 2005, Advisory Action dated May 19, 2009, 3 pages.

U.S. Appl. No. 11/070,317, filed Mar. 1, 2005, Final Office Action dated Feb. 2, 2010, 8 pages.

U.S. Appl. No. 11/070,317, filed Mar. 1, 2005, Final Office Action dated Mar. 4, 2009, 16 pages.

U.S. Appl. No. 11/070,317, filed Mar. 1, 2005, Office Action dated Apr. 30, 2010, 9 pages.

U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Office Action dated Jun. 24, 2010, 20 pages.
U.S. Appl. No. 12/045,220, filed Mar. 10, 2008, Advisory Action dated Jun. 11, 2010, 3 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 11/357,653, filed Feb. 16, 2006, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Advisory Action mailed Apr. 28, 2011, 3 pages.
U.S. Appl. No. 11/943,101, filed Nov. 20, 2007, Office Action mailed Jul. 28, 2011, 11 pages.

U.S. Appl. No. 11/951,500, filed Dec. 6, 2007, Final Office Action mailed Apr. 14, 2011, 33 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Final Office Action dated Jun. 1, 2011, 11 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Office Action mailed May 23, 2011, 18 pages.
U.S. Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 12/544,484, filed Aug. 20, 2009, Office Action dated Jun. 3, 2011, 6 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Office Action mailed Jun. 10, 2011, 13 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 11/357,653, filed Feb. 16, 2006, Office Action dated Apr. 26, 2012, 18 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/019,299, filed Jan. 24, 2008, Final Office Action mailed Aug. 15, 2012, 19 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 13/416,413, filed Mar. 9, 2012, Notice of Allowance mailed Oct. 2, 2012, 5 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.

* cited by examiner

PRAGMATIC APPROACHES TO IMS

CROSS-REFERENCES TO RELATED APPLICATIONS

This application claims the benefit of U.S. Provisional Application No. 61/027,157, filed Feb. 8, 2008 by Maes and entitled "Pragmatic Approaches to IMS," of which the entire disclosure is incorporated herein by reference for all purposes.

BACKGROUND OF THE INVENTION

Embodiments of the present invention relate generally to methods and systems for providing communication services and more particularly to providing IP Multimedia Subsystem (IMS) services on an evolutionary network that may not initially consist of or provide IMS.

Telco operators or service providers in general in various mobile/wireless, fixed and broadband sectors are confronted with new challenges that threaten traditional sources of revenue. For example, revenues from voice services are declining; investments for new network infrastructure and licenses (e.g. 3G and beyond) must be recouped, new competitors from many spaces previously unrelated to telephone services are entering with disrupting technologies or business models, technology and market evolution forces new endless investments and need for new services with the latest capabilities or specifications including convergence across mobile, fixed and broadband (e.g. cable), etc. Service providers are therefore looking for ways to deploy and manage services faster and at lower cost (i.e. compete at Internet speed).

The International Telecommunications Union (ITU) defined the concepts of Next Generation Networks (NGNs) as a packet-based network able to provide telecommunication services to users and able to make use of multiple broadband, QoS-enabled transport technologies and in which service-related functions are independent of the underlying transport-related technologies. It enables access for users to networks and to competing service providers and services of their choice. It supports generalized mobility which will allow consistent and ubiquitous provision of services to users.

The IP Multimedia Subsystem (IMS) is a particular example of an NGN. The IMS represents Third Generation Partnership Project (3GPP) and Third Generation Partnership Project 2 (3GPP2) efforts to define an all IP-based wireless network as compared to the historically disparate voice, data, signaling, and control network elements. Extensions have been developed by other standard bodies like ITU, Packet-Cable and European Telecommunications Standards Institute (ETSI), Telecommunications and Internet converged Services and Protocols for Advanced Networking (TISPAN), and a few other groups. IMS specifies a particular IP-network deployment/architecture to implement IP/multimedia services able to satisfy the requirements of telco service providers in terms of security, charging, regulatory requirements, quality of service (QoS), etc to support the development on IP-networks of traditional telco services (e.g. Telephony) and interwork in a straight-forward standard way with 1N/PSTN etc. As a result, IMS provides rich policy management that allows for differentiated Quality of Service (QoS) and/or Service Level Agreements (SLAs), differentiates service providers, virtual service providers, and other internet providers running in the network, and provides high quality multimedia services. IMS also supports Telco IP/Multimedia services such as Voice over Internet Protocol (VoIP), presence, Instant Messaging (IM), video, broadcast, streaming, and Push-To-Talk (PTT). IMS was expected to drive industry adoption of a standardized, network agnostic, end to end IP architecture to speed time-to-market, reduce costs, compete effectively with new generation players like internet players entering the communications space. IMS was further expected to standardize an end to end IP architecture, ease deployment, provide greater interoperability, and provide a base for convergence.

However, the experience today is that the IMS architecture is complicated, demanding, and relatively inflexible and deployments are long and costly. In general, IMS is a silo investment. Further, IMS is a hard coded end-to-end architecture that does not detail how to ensure integrity of functionality or interoperability on partial IMS deployments. Therefore, a full IMS deployment is typically required. However, the cost, complexity and implications of full IMS deployment can be enormous without an incremental roadmap and the value (technical, interoperability-wise, business-wise, etc.) and market for IMS are unproven and un-validated today. A further complication is that there is not just one IMS specification or architecture but many variations which are not always fully interoperable. These multiple IMS specifications present interoperability challenges. Therefore, contrary to expectations, IMS interoperability across infrastructure vendors is not immediate. Interworking is in fact often challenging. Furthermore, services for IMS can't be provided for the majority of the subscribers on legacy networks. However, various Internet applications can be deployed on legacy IP network to provide similar services and compete efficiently against IMS since they can be deployed without the cost and other issues associated with a full IMS deployment. Other well-known and lesser-known issues also have hindered the adoption of IMS. Hence, there is a need for improved methods and systems for providing IMS services, for example, in an evolutionary or ad hoc basis and on a network that may not initially consist of or provide IMS services.

BRIEF SUMMARY OF THE INVENTION

Embodiments of the invention provide systems and methods for providing telco functions and in some cases one or more IP Multimedia Subsystem (IMS) services on a network that may not initial consist of or provide such functions and/or services. According to one embodiment, a system for providing communication services can comprise a communication network, one or more subsystems communicatively coupled with the network and adapted to provide one or more telco functions, and one or more applications communicatively coupled with the network and adapted to utilize the telco functions. For example, the one or more telco functions include but are not limited to a charging function, security functions such as an access control function, an authentication function, a firewall, etc., a subscription management function, a policy enforcement function, a Quality of Service (QoS) management and enforcement function, a logging function, a presence service, etc. In some cases, the one or more subsystems can be further adapted to provide one or more services with features as provided by IP Multimedia Subsystem (IMS). For example, the one or more services can include but are not limited to a streaming media service, an IP television service, a multimedia messaging service, an instant messaging service, a telephony service, a presence service, a push-to-talk service, a conference service, a download service, etc.

In some cases, the one or more subsystems can comprise a platform adapted to abstract the network and other resources. In such cases, the one or more applications can be adapted to access the network and resources independent of underlying technologies. Such a platform may be implemented as a Service Oriented Architecture. The platform can comprise one or more enablers communicatively coupled with the network. Each enabler can be adapted to provide access to capabilities of the network to the one or more applications independent of the network. For example, the enablers can include but are not limited to one or more of a call control enabler, a media server control enabler, an intelligent messaging enabler, a presence enabler, a location enabler, a QoS management and enforcement enabler, a charging enabler, an authentication enabler, an identity management enabler, a policy enforcement enabler, a subscription management enabler, or a user profile enabler.

According to another embodiment, a method of providing communication services can comprise providing a first telco function abstracted from an underlying network and providing a second telco function abstracted from the underlying network. For example, the second telco function can be provided at a time later than the first telco function when needed or assumed by the applications deployed on the network or services provided to subscribers. The one or more telco functions can include but are not limited to one or more of charging, access control, authentication, a firewall, subscription management, policy enforcement, Quality of Service (QoS) enforcement, logging, a presence service, etc. Additionally or alternatively, one or more services with features as provided by IP Multimedia Subsystem (IMS) can be provided abstracted from the underlying network. For example, the one or more services can include but are not limited to one or more of a streaming media service, an IP television service, a multimedia messaging service, an instant messaging service, a telephony service, a presence service, a push-to-talk service, a conference service, a download service, etc.

Providing the first telco function and the second telco function can comprise providing a platform adapted to abstract the network and other resources wherein one or more applications can access the network and resources independent of underlying technologies. In this way, providing the one or more services with features as provided by IMS can be performed instead of implementing IMS, as part of a migration to an IMS deployment, as a way to integrate the IMS deployment with a legacy network, to test services prior to an IMS deployment, to generate revenues to fund an IMS deployment, etc.

DETAILED DESCRIPTION OF THE INVENTION

Figure 1:
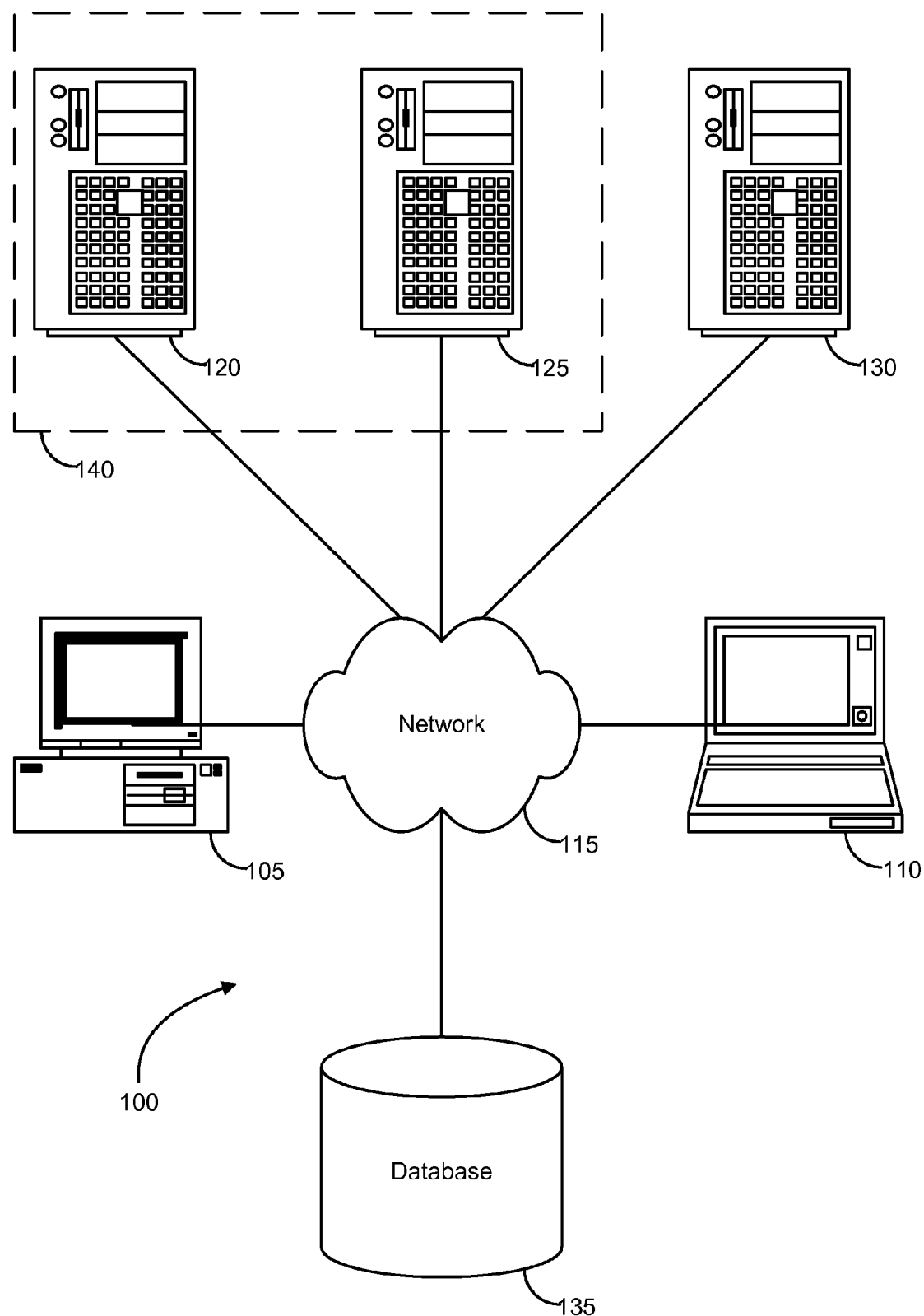
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for telco functions and in some cases one or more IP Multimedia Subsystem (IMS) services on a network that may not initial consist of or provide such functions and/or services. According to one embodiment, a system for providing such functions and/or services can comprise a network supporting or providing one or more telco functions such as charging, access control, authentication, a firewall, subscription management, policy enforcement, Quality of Service (QoS) enforcement, logging, or a presence service, etc. These telco functions can be provided as needed or desired by the service provider. Additionally or alternatively, the services provided can include one or more IMS or IMS-like services defined herein as real-time communications or streaming multimedia or telephony-like services implemented over IP with required features of the telecommunication industry, e.g., class 5 features. Such services can include but are not limited to a streaming media service, an IP television service, a multimedia messaging service, or an instant messaging service, etc.

More specifically, embodiments of the present invention are related to providing one or more IMS or IMS-like services. That is, a network such as the Internet or other IP network can have added thereto a set of one or more telco functions. These functions may be implemented in a network as boxes/network functions, in a Service Delivery Platform (SDP) (as will be described below) or differently. Services can be built to use the IP network and telco functions or assume the network provides the telco functions (e.g. security on transport). Stated another way, a system for providing communication services can comprise a communication network, one or more subsystems communicatively coupled with the network and adapted to provide one or more telco functions, and one or more applications communicatively coupled with the network and adapted to utilize the telco functions. For example, the one or more telco functions include but are not limited to a charging function, security functions such as an access control function, an authentication function, a firewall, etc., a subscription management function, a policy enforcement function, a Quality of Service (QoS) management and enforcement function, a logging function, a presence service, etc. In some cases, the one or more subsystems can be further adapted to provide one or more services with features as provided by IP Multimedia Subsystem (IMS). For example, the one or more services can include but are not limited to a streaming media service, an IP television service, a multimedia messaging service, an instant messaging service, a telephony service, a presence service, a push-to-talk service, a conference service, a download service, etc.

According to one embodiment, the services can be implemented on a platform such as an Service Delivery Platform (SDP) that abstracts the underlying network and/or resources so as to allow applications and/or services to access the network, resources, services, etc. in a way independent of the underlying network(s) and or resource(s) and the technologies upon which they may be implemented. For example, the platform can comprise a SDP. Such a SDP can be implemented, for example, as described in U.S. patent application Ser. No. 11/357,653, filed Feb. 16, 2006, by Maes and entitled "Factorization of Concerns to Build a SDP (Service Delivery Platform)" of which the entire disclosure is incorporated herein by reference for all purposes. The SDP can be implemented as an a Service Oriented Architecture (SOA). In such cases, the one or more applications can be adapted to access the network and resources independent of underlying technologies. If implemented on an SDP that abstracts the network, the same service(s) can work on other network(s) when the network evolves to IMS or on any future network. Additionally or alternatively, the services can be coordinated and coexist or jump from one network to another. Therefore, services/applications developed this way (with SDP that abstracts the network) can then also be provided or coexist or migrate or be continuously switched to an IMS network deployed layer or any future network variations and/or, the service can be offered on legacy networks. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers, laptop computers, Personal Digital Assistants (PDAs), Smartphones, Tablet devices or other computing devices running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or PDA, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, WiMAX, HSDPA, 4G, LTE, etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, PLP, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
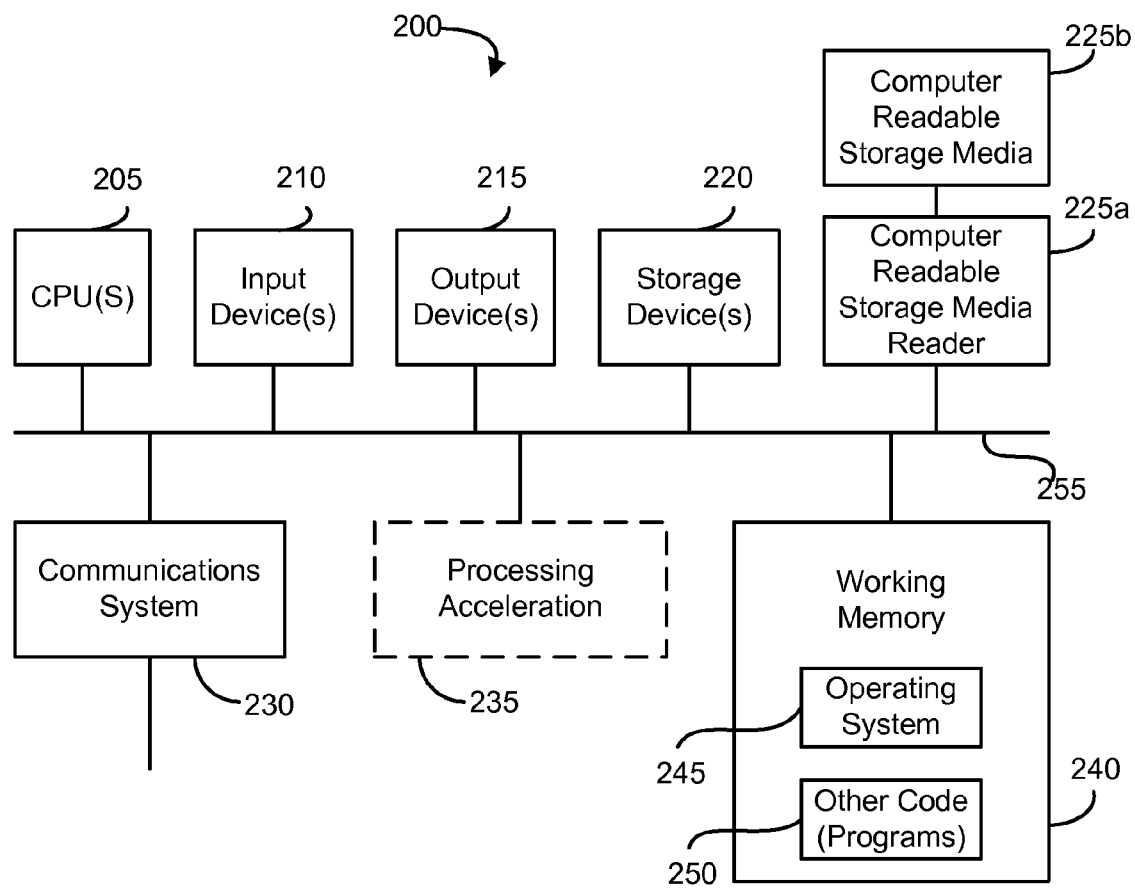
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the invention provide systems and methods for providing telco functions and in some cases one or more IP Multimedia Subsystem (IMS) services on a network that may not initially consist of or provide such functions and/or services. Stated another way, the embodiments of the present invention propose to look at the IMS differently. That is, IMS can be considered to be Internet (or other network) plus a set of useful features or functions for consumers and or Communications Service Providers. These functions, collectively referred to herein as the "telco functions," can include, but are not limited to, Charging, Security (Access control, Authentication, Firewall, etc.), Subscription Management, Policy enforcement, QoS, Logging, Support for specific Telco Services (e.g. Voice). Such functions differentiate an IMS set of features from an IETF vanilla IP network. The functions may vary based on what the service provider wants to achieve and what are the dependencies on the network of the applications that the service provider wants to provide, i.e., what the applications call or assume from the network. The Internet or other network plus these Telco functions allows development of multimedia services as on the IMS. Indeed and as a particular and preferred embodiment, a platform such as an SDP implemented according to the embodiments described herein can provide the same services that can be developed and deployed on any network providing the required capabilities. This is the case of the IMS, Internet plus Telco functions or on legacy networks (PSTN, etc.).

Figure 3:
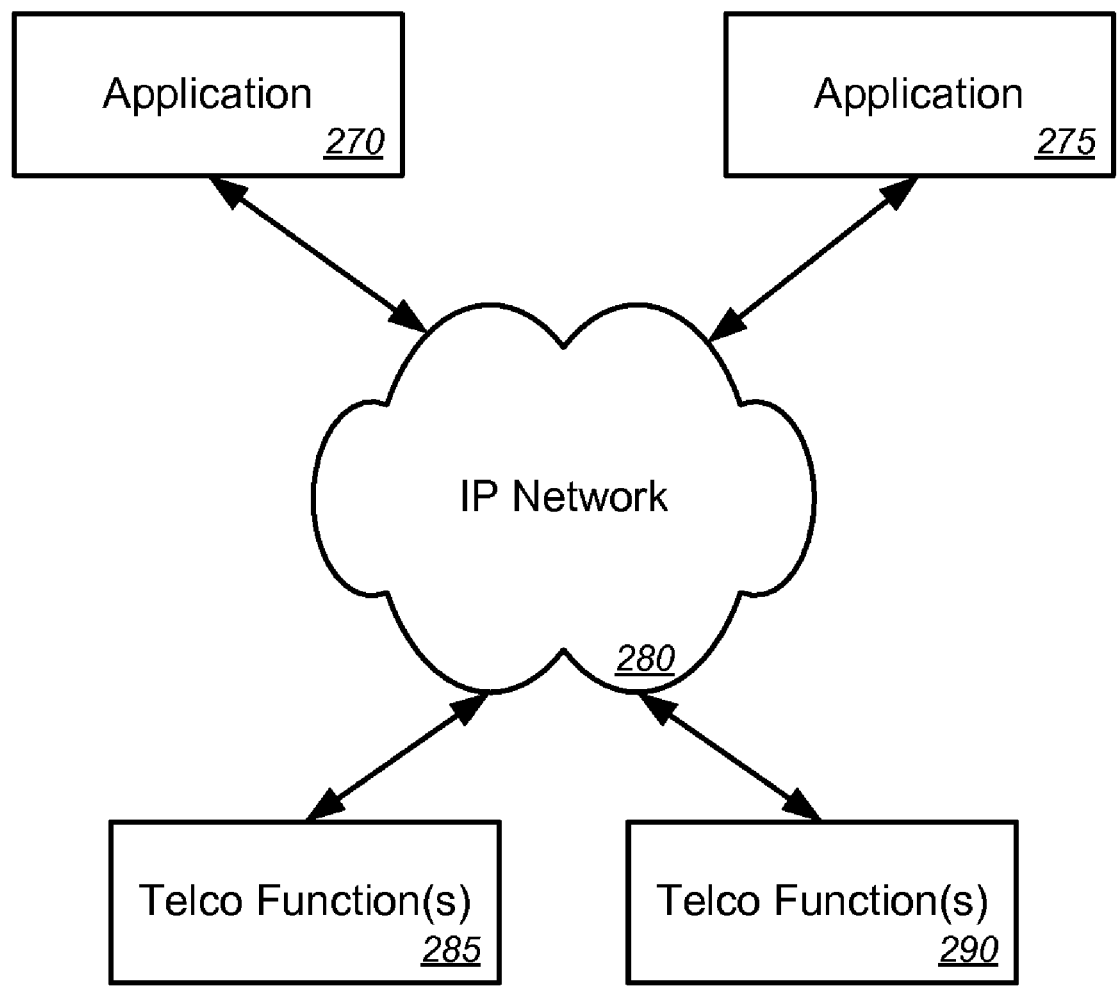
FIG. 3 is a block diagram illustrating at a high level implementation of services on a network according to one embodiment of the present invention.

FIG. 3 is a block diagram illustrating at a high level implementation of services on a network according to one embodiment of the present invention. As illustrated here, an IP network 280 and a number of telco functions 285 and 290 or services can be accessible to one or more applications 270 and 275 or clients (not shown here) such as may be executed or operated by a customer and/or a service provider. Generally speaking, the applications 270 and 275 or devices can access and interact with the telco functions 285 and 290 via the IP network 280 to engage in or affect communications on the IP network 280 or another communication network such as a wired or wireless telephone or other network.

As introduced above, the functions 285 and 290 can include, for example, Charging, Security (Access control, Authentication, Firewall, etc.), Subscription Management, Policy enforcement, QoS, Logging, Support for specific Telco Services (e.g. Voice). In a more specific example, the telco functions as described herein can include but are not limited to those such as described in and supported by the methods and systems of U.S. patent application Ser. No. 11/536,731 filed Sep. 29, 2006 by Maes and entitled "Service Provider Functionality with Policy Enforcement Functional Layer Bound to SIP" the entire disclosure of which is incorporated herein by reference for all purposes. Security functions can be implemented with an authentication (and identity management) enabler that has adapters to perform authentication based on different schemes (e.g., different schemes for IMS versus Internet, versus others). So, authentication can be modeled with an authentication enabler that confirms to an application if the authentication has taken place independent of how the authentication is done. Security functions can then be provided via VPN, encrypted RTP and SIP, SSL, and/or firewalls including but not limited to the examples as described, for example, in U.S. patent application Ser. No. 11/512,585 filed Aug. 29, 2006 by Maes and entitled "Cross Network Layer Correlation-Based Firewalls" the entire disclosure of which is incorporated herein by reference for all purposes.

The functions 285 and 290 as described herein can also include but are not limited to charging functions. For example, such charging functions can be provided via a charging enabler 544 such as described, for example, in U.S. patent application Ser. No. 12/544,484 filed Aug. 20, 2009 by Maes and entitled "Charging Enabler" the entire disclosure of which is incorporated herein by reference for all purposes. Furthermore, according to one embodiment, a smart router or proxy can be implemented that enforces or ensures that traffic passing through the router is charged or calls the charging enabler to perform charging. In such cases, uncharged traffic can be rejected or blocked. For example, this enforcement can be implemented according to the methods and systems described in U.S. patent application Ser. No. 11/123,471 filed May 5, 2005 by Maes and entitled "Charging via Policy Enforcement," U.S. patent application Ser. No. 11/475,280 filed Jun. 26, 2006 by Maes and entitled "Techniques for Correlation of Charges in Multiple Layers for Content and Service Delivery," U.S. Pat. No. 7,426,381 filed Mar. 23, 2005 by Maes and entitled "Device Billing Agent," U.S. Pat. No. 7,403,763 filed Sep. 19, 2005 by Maes and entitled "Device Agent," U.S. patent application Ser. No. 12/130,101 filed May 30, 2008 by Maes and entitled "Device Agent," and U.S. patent application Ser. No. 12/173,797 filed Jul. 15, 2008 by Maes and entitled "Device Billing Agent" of which the entire disclosure of each is incorporated herein by reference for all purposes.

The functions 285 and 290 as described herein can also include but are not limited to subscription management and user profile functions. For example, subscription management and user profile functions can be implemented using a UUP as described in U.S. patent application Ser. No. 11/926,738 filed Oct. 29, 2007 by Maes and entitled "Shared View of Customers Across Business Support Systems (BSS) and a Service Delivery Platform(SDP)" (e.g., for delegation of subscription management to OSS and BSS), and U.S. patent application Ser. No. 12/019,299 filed Jan. 24, 2008 by Maes and entitled "Service-Oriented Architecture (SOA) Management of Data Repository" (e.g., to abstract data sources such as LDAP, HSS, databases, Radius etc.), of which the entire disclosure of each is incorporated herein by reference for all purposes. Additionally or alternatively, subscription management and/or user profile functions can be implemented according to the methods and systems described in U.S. patent application Ser. No. 12/019,335 filed Jan. 24, 2008 by Maes and entitled "Integrating Operational and Business Support Systems with a Service Delivery Platform" and/or U.S. patent application Ser. No. 12/948,450 filed Nov. 17, 2010 by Maes and entitled "Methods and Systems for Implementing Service Level Consolidated User Information Management" of which the entire disclose of each is incorporated herein by reference for all purposes.

The functions 285 and 290 as described herein can also include but are not limited to performing and/or supporting continuity. For example, continuity functions can be performed as described in U.S. patent application Ser. No. 12/949,183 filed Nov. 18, 2010 by Maes and entitled "Interface for Communication Session Continuation" and/or U.S. patent application Ser. No. 12/949,287 filed Nov. 18, 2010 by Maes and entitled "In-Session Continuation of a Streaming Media Session" of which the entire disclose of each is incorporated herein by reference for all purposes.

The functions 285 and 290 as described herein can also include but are not limited to providing and/or maintaining Quality of Service (QoS) requirements. QoS can be defined by allocating available bandwidth based on a Service Level Agreement (SLA), reserving for services and allocating more (or blocking other traffic) when QoS is too low, and using many different approaches. For example, maintaining QoS can be performed as described in U.S. patent application Ser No. 12/544,471 filed Aug. 20, 2009 by Maes and entitled "Service Level Networker Quality of Service Policy Enforcement" of which the entire disclosure is incorporated herein by reference for all purposes. QoS functions provided added to the IP network as described herein can support different networks with different bandwidth capacities linked to proxies which are set based on the SLAs. Traffic from authenticated users can be submitted between proxies based on the SLA for that user.

That is, a network such as the Internet or other IP network 280 can have added thereto a set of one or more telco functions 285 and 290. These functions 285 and 290 may be implemented in a network as boxes/network functions, in a Service Delivery Platform (SDP) or differently. Services can be built to use the IP network 280 and telco functions 285 and 290 or assume the network provides the telco functions 285 and 290 (e.g. security on transport). According to one embodiment, a system for providing such functions and/or services can be implemented using a Service Delivery Platform (SDP). For example, a system for providing one or more telco functions can comprise a transport layer. The transport layer can include a communication network. The system can also include a service layer communicatively coupled with the transport layer. The service layer can be adapted to abstract the transport layer and provide the one or more IMS services via the transport layer independent of the communication network of the transport layer. For example, the service layer can comprise a SDP. Such a SDP can be implemented, for example, as described in and the application entitled "Factorization of Concerns to Build a SDP (Service Delivery Platform)" referenced above. As described therein, such an SDP focuses on the service layer independent of the underlying network technologies.

Generally speaking, an SDP such as described in the referenced application can be defined as a horizontal platform that that abstracts underlying network resources via a set of enablers. As will be described in greater detail below, these enablers can comprise service components performing or providing access to various functions or services as described above (e.g. Call Control, Presence, Charging, Messaging, location, user profile, media server control, and other custom functions, etc.) and providing various adapters (e.g., SIP, HTTP, JCA 1.5, etc.) to access those functions or services. The SDP comprises a converged container/environment including Application Servers (OSA, SIP, HTTP) with enabler implemented on them in which all objects can interact with each other in a single execution environment.

According to embodiments of the present invention and as will be described in greater detail below, such an SDP can be adapted to provide one or more IMS or IMS-like services. Generally speaking, IMS can be viewed as an IP network with a set of useful features for communications service providers (referred to commonly and herein as telco functions): e.g. charging, security (e.g., access control, authentication, firewall, etc.), subscription management, policy enforcement, QoS, logging, support for specific telco services (e.g. voice). The Internet or other IP network along with these Telco functions also allow the development of multimedia services similar as on the IMS. The only difference between the IMS and a IP network with implementations of such Telco functions is that IMS has a pre-specific and hard coded architecture and deployment model while generic IP networks do not prescribe the architecture or how the telco functions are provided. A well-designed SDP according to embodiments of the present invention provides that the same services can be developed and deployed on IMS, Internet with the Telco functions that the service would assume or on legacy networks (PSTN, etc.). If implemented on an SDP that abstracts the network, the same service(s) can work on other network (s) when the network evolves to IMS or on any future network. Additionally or alternatively, the services can be coordinated and coexist or jump from one network to another. Therefore, services/applications developed this way (with SDP that abstracts the network) can then also be provided or coexist or migrate or be continuously switched to an IMS network deployed layer or any future network variations and/ or, the service can be offered on legacy networks. Additional details of various implementations of the present invention utilizing such an SDP are described below.

Figure 4:
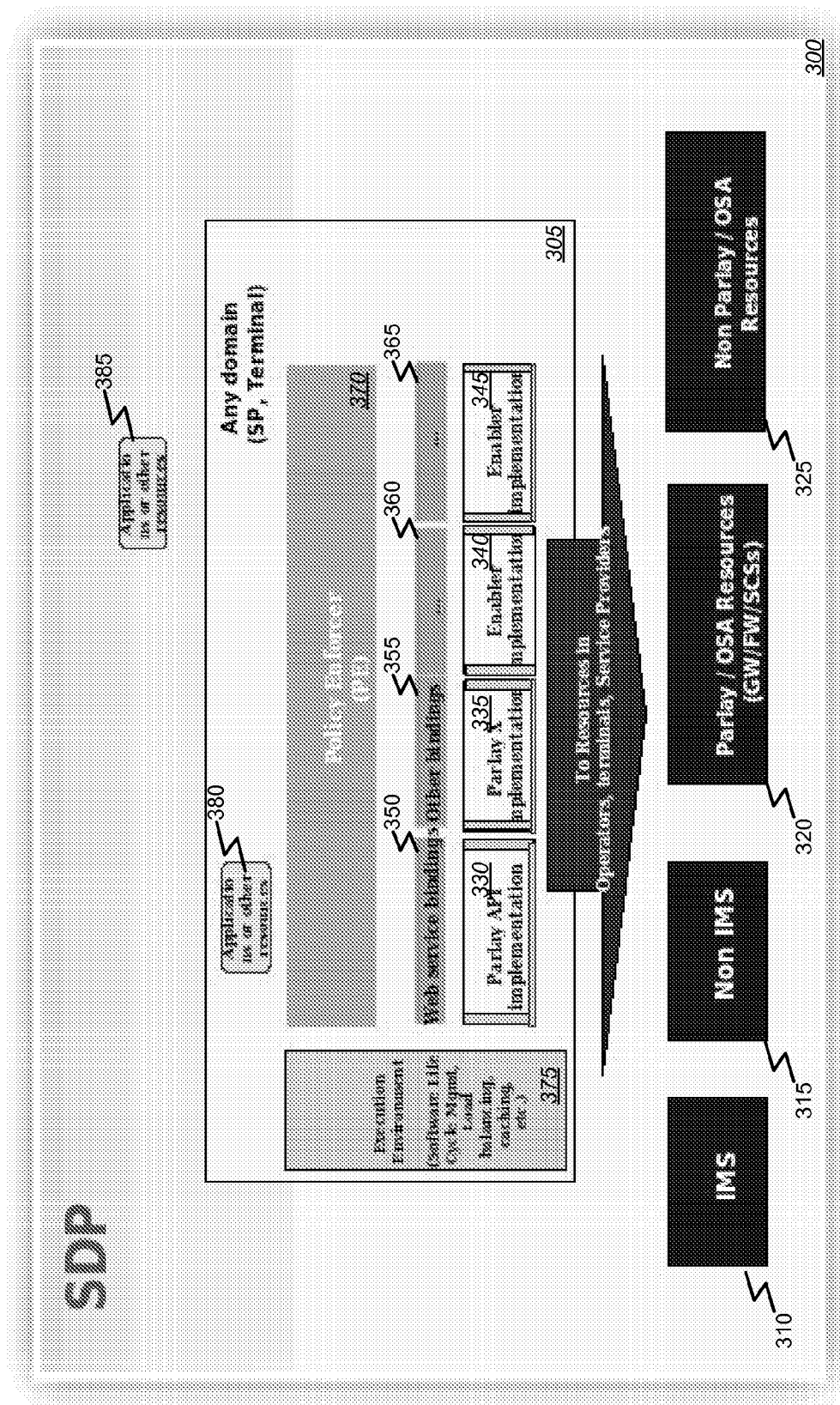
FIG. 4 is a block diagram illustrating an environment for implementing a service layer according to one embodiment of the present invention.

FIG. 4 is a block diagram illustrating an environment for implementing a service layer according to one embodiment of the present invention. In this example, the SDP 305 comprises a number of services 310 and 315 such as IMS network with resources and capabilities 310 and non-IMS network with resources and capabilities (e.g. an IP network with telco functions as described above) 315 as well as a number of other network resources 320 and 325 such as Parlay resources 320 and non-Parlay resources 325.

The SDP 305 can include a number of enablers 330-345 including but not limited to a Parlay API implementation 330 a Parlay X implementation 335 and/or other enablers 340 and 345. The various enablers 330-345 are defined to provide reusable, composable components with specific functions and can be adapted to provide an abstract interface to network resources 320 and 325, 310 and 315. According to one embodiment, the Parlay API implementation 330 and Parlay X implementation 335 (and any other enablers) can be implemented with southbound adapters to SIP or other protocols e.g. via JCA 1.5 or other protocols. When they consist of Parlay, they can be provided by an OSA application server The SDP 305 can also include one or more bindings 350-365 adapted to provide standard northbound interfaces for the one or more enablers 330-365. According to one embodiment, the enablers and interfaces can be implemented according to the methods and systems described in U.S. patent application Ser. No. 11/951,500 filed Dec. 6, 2007 by Maes and entitled "Achieving Low Latencies on Network Events in a Non-Real Time Platform" of which the entire disclosure is incorporated herein by reference for all purposes.

Such a horizontal platform can be standards-based and follow the SDP blueprint described in the Application entitled "Factorization of Concerns to Build a SDP (Service Deliver Platform) referenced above. Accordingly, applications 380 and 385 can be based on the SOA composition of reusable piece of codes (i.e. enablers 330-365) that expose relevant and intrinsic communications functionalities along with other reusable services which may not be standard or expose intrinsic functions. Intrinsic means that one type of functions relevant to the nature of the enabler is exposed and other aspects that are driven by business rules need not included. So for example, a messaging enabler need not include authentication, authorization, charging etc. These functions can be left to other enablers composed by the application 380 or 385 to add these features based on the business rules (aka policies). Enablers 330-365 when implemented by driving network resources or OSS/BSS resources can do that through an adapter approach. The same enabler 330-365 can use different adapters to be realized/implemented on different network technologies or using equipment from different vendors (when non standard). Doing this, the same enablers 330-365 can be deployed or even coexist on multiple network technologies like legacy networks (e.g. PSTN, IN, . . . with our without Parlay/OSA GWs), against other network resources (e.g. messaging GWs), on internet and on IMS and variations (e.g pre-IMS, different release or IMS variations across standard bodies, future IMS etc.).

The SDP 305 can also include one or more policy enforcers 370. The policy enforcer 370 can be adapted to apply one or more policies to messages to or from the one or more enablers 330-345. A policy can be defined as any combination of a condition and one or more associated actions. Therefore, policies can be enforced to implement and/or enforce a service oriented architecture, factor out business rules, and define interactions between applications 380 and 385. Policies can be implemented and/or enforced by the policy enforcers 370 of the SDP 305, for example, according to the methods and systems described in one or more of the following applications: U.S. patent application Ser. No. 11/024,160 filed Dec. 27, 2004 by Maes and entitled "Policies as Workflows;" U.S. patent application Ser. No. 10/855,999 filed May 28, 2004 by Maes and entitled "Method and Apparatus for Supporting Service Enablers via Service Request Handholding;" U.S. patent application Ser. No. 10/856,588 filed May 28, 2004 by Maes and entitled "Method and Apparatus for Supporting Service Enablers via Service Request Composition;" and U.S. patent application Ser. No. 11/565,578 filed Nov. 30, 2006 by Maes and entitled "Orchestration of Policy Engines and Format Technologies" of which the entire disclosure of each is incorporated herein by reference for all purposes.

As noted, enablers 330-365 can expose northbound interfaces for their composition and use by other enablers, resources or applications 380 or 385. Standard interfaces can lead to Java and web services bindings 350 and other technologies like C, C+, etc. Enablers 330-365 can be composed via SOA. The policy enforcer 370 can be a SOA composition/ orchestration engine. As such, it applies the business rules when the enablers 330-365 are used by applications 380 and 385 when trying to use an enabler message and responses can be intercepted by the policy enforcer 370 that enforces the policies by composing calls to other enablers and resources as specified by the policies. This can be generalized to any composition. Applications 380 and 385 can compose enablers 330-365 to take advantage of communications features. There are no differences between local and remote, trusted or un-trusted applications. They only differ by the fact that different policies/business rules apply. Of course, it is possible that local applications rely on different bindings than remote applications. Enablers that are contemplated and considered to be within the scope of the present invention include but are not limited to a call control enabler as described in U.S. patent application Ser. No. 11/949,930 filed Dec. 4, 2007 by Maes and entitled "Call Control Enabler Abstracted from Underlying Network Technologies", a media server control enabler as described in U.S. patent application Ser. No. 11/877,129 filed Oct. 23, 2007 by Maes and entitled "Network Agnostic Media Server Control Enabler", an intelligent messaging enabler as described in U.S. patent application Ser. No. 11/939,705 filed Nov. 14, 2007 by Maes and entitled "Intelligent Message Processing" of which the entire disclosure of each is incorporated herein by reference for all purposes. As described in the referenced applications and herein, these enablers can operate on different networks with possibly different underlying technologies while abstracting that technologies to the applications utilizing the functions provided by those enablers.

The set of enablers 330-365 can expose both network and application specific common, reusable intrinsic functions. Furthermore, the framework for specifying enablers 330-365 should be extensible so that additional enablers can be developed as needed. Enablers 330-365 can be reusable components that expose a useful set of network or application specific capability through northbound, standardized APIs. In the case of a J2EE realization of the SDP 305, such APIs can be exposed through either Java APIs, Web Services 350, or other bindings (e.g. SOAP, REST, etc.) 355-365. Enablers 330-365 can be realized via southbound adapters on the underlying network resources/network technologies. In particular they can be intended to be realizable on vanilla SIP networks (e.g., IETF), IMS, PSTN, IN or any other network technology as appropriate. South bound interfaces to implement the enablers 330-365 on any underlying network or resources can rely on JCA 1.5 with a design for high throughput and predictable low latencies, e.g. Parlay Corba adapters to Parlay GW/SCSs, Diameter, Connectors to legacy/proprietary resources like messaging GWs, Billing systems (e.g. Oracle BRM); SIP; HTTP as well as towards OSS and BSS. Other technologies can include but are not limited to RA, RMI, etc.

Enablers 330-365 can provide functions they're designed to provide (e.g., user location or call control) and should explicitly not provide that are set up by an operator's policies (e.g., security, authentication, authorization, SLA/QoS, Charging). Execution and enforcement of such policies are appropriately handled by the SOA layer (detailed in a later section). Parlay API implementations 330 (e.g. Java realizations) and Parlay X API implementations 335 (i.e. web services bindings) can include, for example, call control, messaging/notification, charging, location, terminal status, and user interaction.

Generally speaking, the SDP 305 provides an architecture framework that describes the interaction with and among enablers 330-345, services 310 and 315 and resources 320 and 325. According to one embodiment, the SDP 305 can be implemented as a Service Orchestration Architecture (SOA).

For example, the blueprint described in the application entitled "Factorization of Concerns to Build a SDP (Service Delivery Platform)" referenced above and derived from the SDP 305 ensures that enablers 330-345 correctly abstract the network technologies. As a result, an application 380 or 385 is not affected by the coexistence or migration across network technologies as long that the network can bear the same capabilities.

According to one embodiment, the SDP 305 can be focused on implementing or supporting the services layer of solutions rather than the network layers (and session layers) of solutions, for areas such as handheld devices and network equipment. Such a service layer can accommodate any choice made by operator customers for the network layers, network and OSS/BSS resources and handsets. Additionally, the SDP 305 allows applications 380 and 385 to be developed and deployed to coexist across different network technologies and resources, migrate without change from one technology to another in support of convergence where the same services are available for a subscriber independent of the access network (whenever it makes sense and with the services adapted as appropriate) with the same user experience in terms of availability, subscription, support and billing, and where service continuity (switch from one network to another while preserving relevant sessions/contexts) can be provided when it makes sense.

Figure 5:
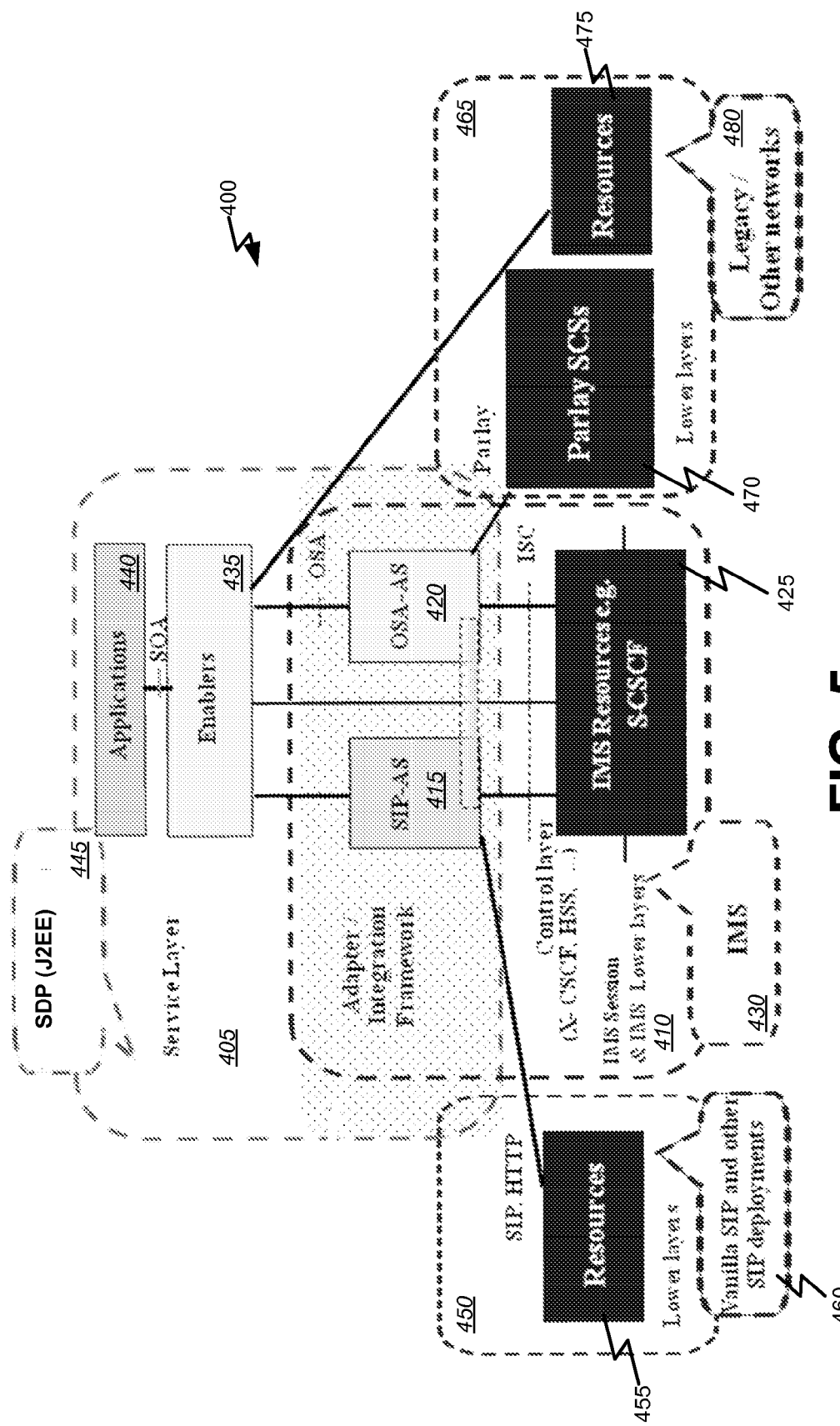
FIG. 5 is a block diagram illustrating an implementation of a SDP for providing IMS services according to one embodiment of the present invention.

FIG. 5 is a block diagram illustrating an implementation of a SDP for providing IMS services according to one embodiment of the present invention. In this example, the system 400 comprises a service layer 405 and a control layer 410. As described above, the service layer 405, which can be implemented, for example, as a SDP 445 in J2EE, can include one or more enablers 435 such as described above through which applications 440 can interface with the system 400. The service layer 405 can also include one or more SIP application servers 415 for providing/supporting SIP implementations and/or one or more OSA application servers 420 for providing/supporting Parlay implementations as noted above. Adapters can also provide abstractions of these capabilities on legacy networks like IN, PSTN etc by supporting protocols (including different versions and variations/extensions) like CAP, TCAP, INAP, CAMEL, etc.

The control layer 410 can include a number of IMS resources 425 supporting one or more IMS sessions 430. One or more SIP, HTTP sessions 450 can be supported by a number of SIP, HTTP resources 455, also in the control layer. These sessions can be implemented, for example, on vanilla SIP or any other SIP deployment 460. Similarly, one or more Parlay service capability servers 470 and Parlay resources 475 can support one or more Parlay sessions 465. These Parlay sessions 465 can be implemented on any legacy or other network 480.

As noted, at the service layer 405 can be implemented following specifications in terms of J2EE, converged HTTP/SIP containers (e.g. JSR 116 with a roadmap to JSR 289 when available and future releases thereafter) and service layer SDP blueprints. However, it should be understood that this implementation is an exemplary embodiment only and other environments (e.g., .NET, JAIN, SLEE, other SLEEs, etc.) are contemplated and considered to be within the scope of the present invention. In particular, converged communications applications 440 can be developed and deployed on an extensible horizontal converged container that provides the functions of the SIP AS 415, the OSA AS 420, telephony/multimedia control functions (Telephony AS) and other mobile, voice or communications functions within a single container, where a converged container enables context sharing, inprocess and local invocations where appropriate, efficient event marshalling as well as life cycle management (through common, uniform mechanisms) across all the elements of the container. This implies that objects like HTTP servlets, SIP servlets, JCA adapters, enablers 435, OSA AS 420 (i.e. Parlay JR and Parlay X components) and other application components implemented in the container can interact with each others at any time. A common horizontal service layer exists 405, implying that the same (logical) container can be deployed to develop and deploy applications 440 over any underlying network technology, network access and network resources 425, 455, and/or 475 (through custom adapters that can be developed when required).

The SIP AS 415 can be, for example, an IETF Vanilla SIP AS and IMS SIP AS (e.g. following JSR 116 (as well as in the future to JSR 289) and 3GPP/2 specifications). The OSA AS 420 can be a Parlay/OSA AS according to specifications of ETSI, 3GPP/2. Telephony AS (not shown here) and other mobile, voice or communications functions refer to the enabler 435 functions described below (e.g., the Call Control Enabler, the Media Server Control Enabler, the Voice Enabler, etc. as referenced above) as well as telephony functions (like call barring, call forwarding, legal intercept, E911, call hunting, queue management, etc.) that can be composed to form applications like VOIP residential, VPBX, and others.

According to the 3GPP specifications, applications can be written in SIP (e.g. as SIP servlets) against the OSA AS 420 (e.g. Parlay APIs, JR and Parlay X) and the reference points of the IMS sessions 430. However, such applications do not mix and use these different capabilities in a standard way, e.g., sending a message form SIP application server 415 etc., and SIP does not expose these messages to third parties. Furthermore, these applications in SIP are typically dedicated to IMS and would need to be changed (e.g., change header, change assumptions on router, authentications, etc.) to execute on/with Internet or a legacy network. That is, typical applications written assuming the reference points for IMS run only on IMS. Similarly, applications written in the OSA AS 420 run only on legacy networks with Parlay gateways.

According to one embodiment, an SDP 445 as described here and in the application entitled "Factorization of Concerns to Build a SDP (Service Delivery Platform)" referenced above, can be adapted to provide the ability to write applications independent of the underlying network technology or technologies. More specifically, according to the methods and systems described in the application entitled "Factorization of Concerns to Build a SDP (Service Delivery Platform)" applications 440 can be written again the enablers 435 that abstract the underlying network technologies. The enabler 435 adapters are written for the SIP AS 415, OSA AS 420, and/or other adapters to networks, gateways, and/or resources (e.g., messaging gateways, legacy IN protocols without Parlay gateways, etc.). Therefore, an application 440 does not need to be written to the different networks and it can be moved from one network to another with no change other than maybe building the adapters for the enablers 435. However, such adapters are then reusable across other applications. An application 440 can also be migrated from network technology to network technology and/or can coexist across networks (on different networks the user can find the same applications possibly adapted to the network and/or means of interaction). Such applications 440 are in effect "future proof" since whatever is tomorrow's network technologies and protocols, new enabler adapters can be built to run on them without requiring changes to the applications 440.

Accordingly, convergence can be provided with or without IMS so that the services supported by the applications 440 can be made available on different access networks, i.e., the service application layer 405 allows coexistence of a service across networks. In other words, the SDP 445 abstracts the network technologies and is extensible as needed in the service layer 405 with or without IMS. If implemented on an SDP that abstracts the network, the same service(s) can work on other network(s) when the network evolves to IMS or on any future network. Additionally or alternatively, the services can be coordinated and coexist or jump from one network to another. Therefore, services/applications developed this way (with SDP that abstracts the network) can then also be provided or coexist or migrate or be continuously switched to an IMS network deployed layer or any future network variations and/or, the service can be offered on legacy networks. Therefore, various services and/or capabilities can be implemented as desired. For example, these capabilities can include but are not limited to the capability to recognize, authenticate and manage (e.g. federate) the identity of the users across the different channels. This can be addressed, for example, with identity management across network and service layer (middleware/SDP and applications). In another example, the capability to share the management of the user information and assets (e.g. subscriptions, bills, assets, etc.) can be achieved by sharing the OSS/BSS across channels and relying on the same identity management. This is can be implemented, for example, by integrating the OSS/BSS with the service layer 405 following the methods and systems described in U.S. patent application Ser. No. 12/019,299 filed Jan. 24, 2008, by Maes and entitled "Service-Oriented Architecture (SOA) Management of Data Repository" of which the entire disclosure is incorporated herein by reference for all purposes.

Furthermore, continuity can be provided at the service layer 405. So, for example, with an SDP 445 as described herein and context in an horizontal service layer 405, service continuity can be achieved as soon as that network/radio continuity is supported. For example, Voice Call Continuity (VCC) in the service layer 405 can be achieved with function calls with many customizable features, e.g., criteria for switching or ways to implement the switch, involved clients, etc. According to one embodiment, a service level Service Capability Interaction Manager (SCIM) can be implemented for IMS. Such a SCIM can provide the same composition capability on Internet IMS and legacy networks. Additionally or alternatively, such a SCIM can provide for use context and ease of composition with other services (e.g. SMS in/out). The SCIM and/or SDP can be implemented, for example, according to one or more of the methods and systems described in U.S. patent application Ser. No. 12/018,718 filed Jan. 23, 2008 by Maes and entitled "Service Oriented Architecture-Based SCIM Platform," U.S. patent application Ser. No. 12/791,129 filed Jun. 1, 2010 by Maes and entitled "Telephony Application Services," U.S. patent application Ser. No. 13/029,226 filed Feb. 17, 2011 by Maes and entitled "True Convergence with End To End Identity Management," U.S. patent application Ser. No. 12/831,603 filed Jul. 7, 2010 by Maes and entitled "Protocol Level Communications for Protocol Level Composition with Session Sharing," U.S. patent application Ser. No. 13/021,974 filed Feb. 7, 2011 by Maes and entitled "Service Deliver Platform Based Support of Interactions Between Next Generation Networks and Legacy Networks," U.S. patent application Ser. No. 13/021,982 filed Feb. 7, 2011 by Maes and entitled "Service Level Cross Network Coordinated Interaction," and U.S. patent application Ser. No. 13/021,991 filed Feb. 7, 2011 by Maes and entitled "Service Based Consolidation of Applications Across Networks" of which the entire disclosure of each is incorporated herein by reference for all purposes.

Figure 6:
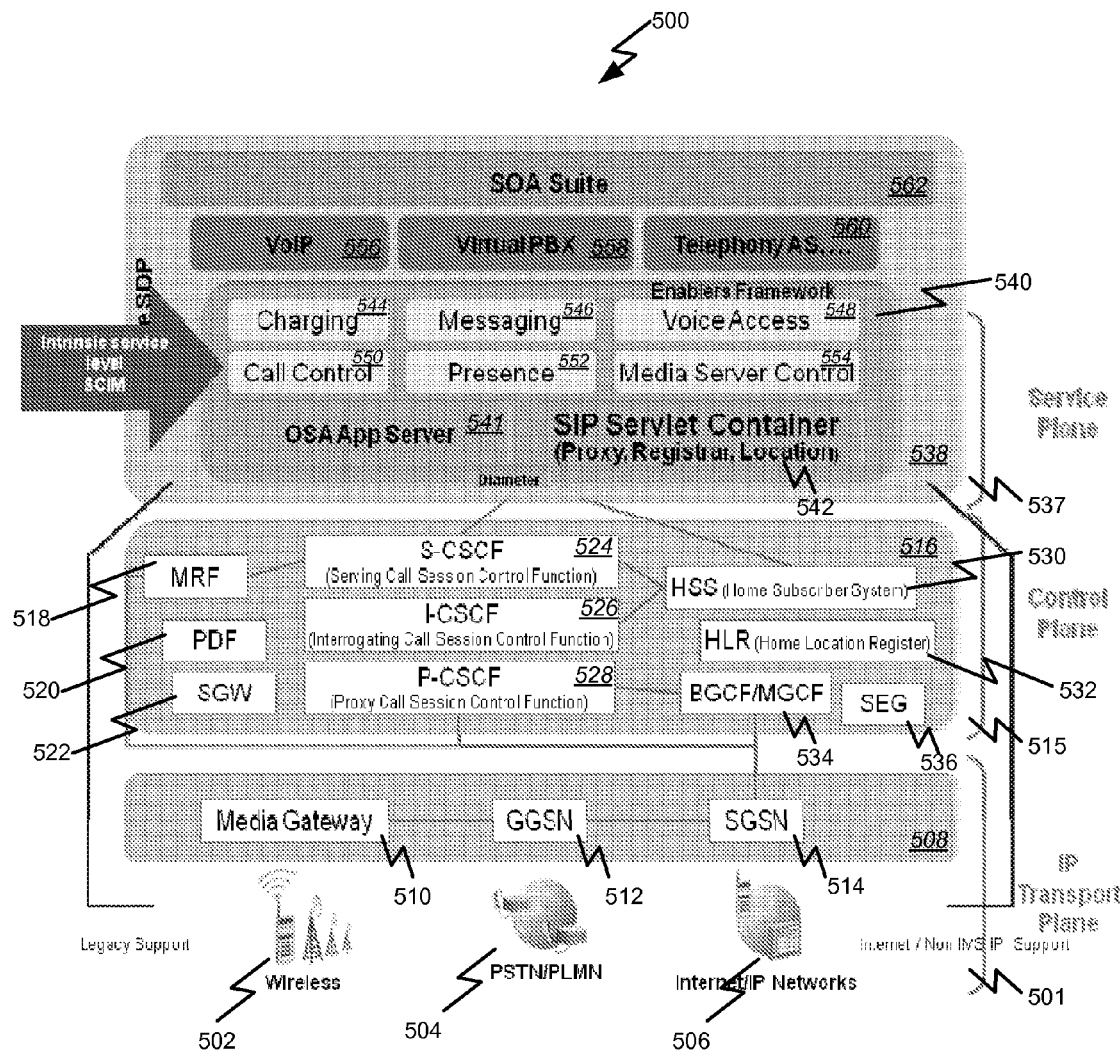
FIG. 6 is a block diagram illustrating additional details of one implementation of a SDP for providing IMS services according to one embodiment of the present invention according to one embodiment of the present invention.

FIG. 6 is a block diagram illustrating additional details of one implementation of an SDP for providing IMS services according to one embodiment of the present invention according to one embodiment of the present invention. In this example, the system 500 can include a transport layer 501, a control plane 515, and a service layer 537. The transport layer 501 can include a number of different networks 502-506 such as a wireless network 502, a PSTN network 504, an IP network 506, etc. The transport layer can also include gateways 508 for accessing these networks such as a media gateway 510, a Gateway General Packet Radio Service (GPRS) Support Node 512, a Serving GPRS Support Node 514, and others.

The control plane 516 can include a number of different functions 518-536. For example, these functions can include but are not limited to media resource functions 518, Policy Decision Function (PDF) 520, a signaling gateway functions 522, serving call session control functions 524, interrogating call session control functions 526, proxy call session control functions 528, home subscriber system 530, home location register 532, breakout gateway control functions 534, and/or security gateway 536.

According to one embodiment of the present invention, the service layer 537 can include an enabler framework 540 of an SDP 538 as described above. The enabler framework 540 can include an OSA application server 541 and/or a SIP servlet 542 also as described above. Enablers 544-554 or the enabler framework 540 can include but are not limited to: Messaging 546, e.g., application to person and person to application multi-channel messaging able to support email, SMS, MMS, IM, Voice Messages and SIP; Presence 552, e.g., Presence, XDM and RLS enabler functions that can be aggregated across multiple presence-enabled networks and sources; Call control 550, e.g., generic, 3rd party and multi party call control (voice and media) realizable on many network technologies for application routing/dispatching independently of the network technology; Media server control 554, e.g., media processing, mixing and streaming control realizable against many network and media server technologies; Voice Access 548, e.g., inclusion of voice and DTMF dialogs in a call/interaction with a user; Web and mobile access (not shown here), e.g., multi-channel portal including associated supporting technologies such as device recognition, device repository, adaptation and delivery to multiple channels; Charging 544, e.g., service level on-line and offline charging including Balance check/tracking, pre-rated charges, delegated rating and rate inquiries; Device Management (not shown here), e.g., device and network resource provisioning, policy execution, enforcement and management providing functions such as PDP (Policy Decision Point), PEP (Policy Enforcement Point), PEEM (Policy Evaluation Enforcement and Management) (callable and proxy mode), PE (Policy Enforcer); and others. Providing additional/new enablers or extending them can be accomplished by developing new J2EE components with northbound interfaces, following the enabler principles and reusing the enabler framework functions or by developing new adapters using standard technologies and recipes (e.g. JCA 1.5, SIP, HTTP, etc.) to integrate existing enabler with new resources, protocols or network technologies.

As noted above, the service layer 537 can intrinsically include a service level SCIM. Such a SCIM can support services/applications across networks, potentially of different types, with or without IMS. According to one embodiment, the service layer 537 can implement, for example, IMS Service Switching Functions (IM-SSF) and/or IMS Service Control Functions (IM-SCF). Therefore, via the SCIM and/or IM-SSF/IM-SCF, legacy applications can run on new networks and/or new applications can interact with legacy networks of different type without modification. The SDP 538 can also include a number of applications 566-560 providing, for example, VoIP services 556, a virtual PBX 558, a telephone application server 560, and/or a SOA suite 562. According to one embodiment, a SOA 562 such as illustrated here can be implemented with an Enterprise Service Bus (ESB) and in turn integrated with OSS/BSS systems. Via these applications 566-560, the SDP can provide/support a number of services on one or more networks independent of the underlying network technology. So, for example, various telco functions as described above and/or IMS or IMS-like services can be implemented/provided on the Internet with telco functions or another type of network (IN/legacy etc). Therefore, embodiments of the present invention support development of services in the service layer for an IP network with telco functions (and therefore not requiring IMS but matching or providing some or all of the services that are developed/provided by IMS) or develop on top of SDP in which case the services can then also be provided (coexist or migrate and/or possibly providing switching with continuity from one network to another) on any variation of IMS, IN/legacy networks, etc. If implemented on an SDP that abstracts the network, the same service(s) can work on other network(s) when the network evolves to IMS or on any future network. Additionally or alternatively, the services can be coordinated and coexist or jump from one network to another. Therefore, services/applications developed this way (with SDP that abstracts the network) can then also be provided or coexist or migrate or be continuously switched to an IMS network deployed layer or any future network variations and/or, the service can be offered on legacy networks.

Figure 7:
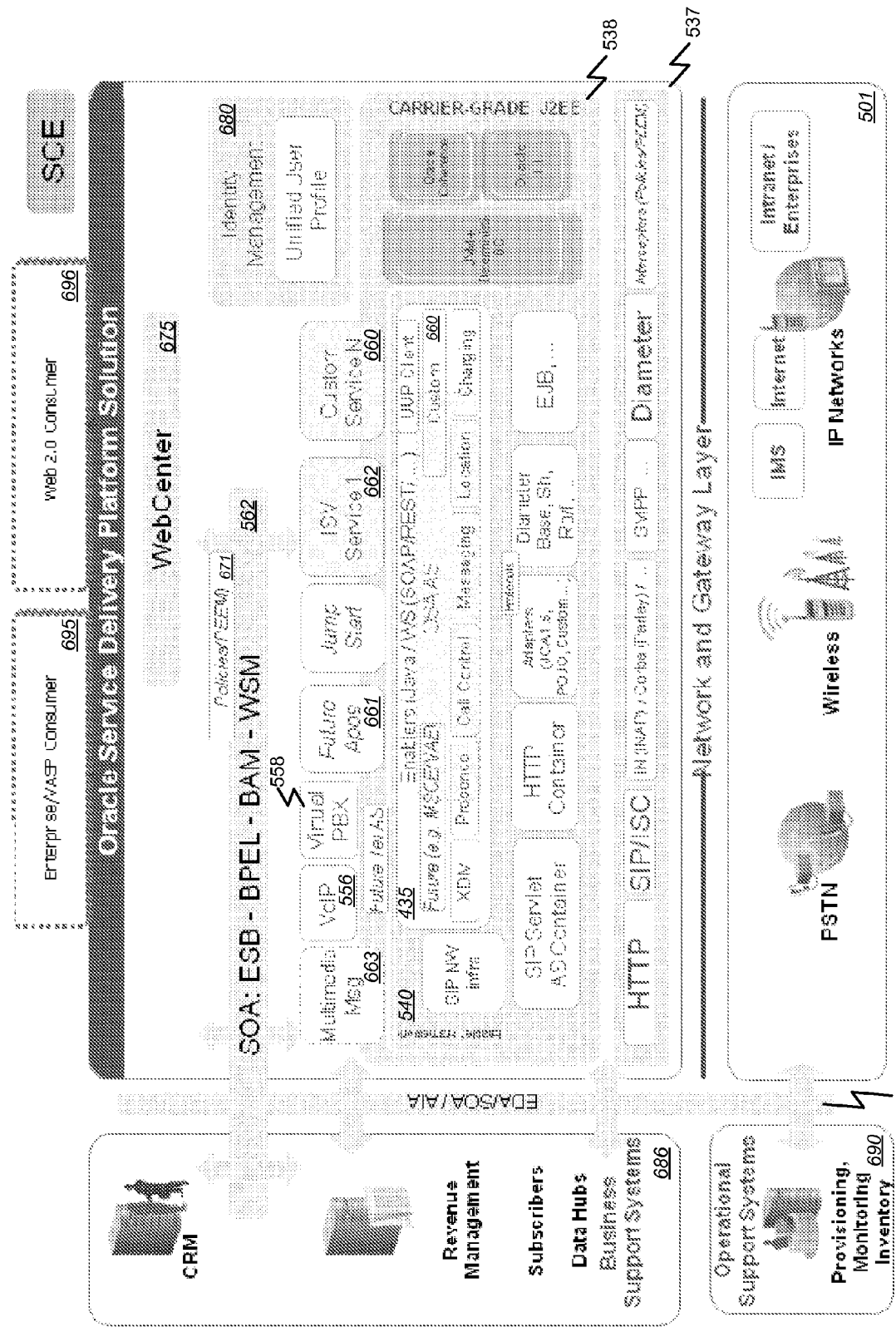
FIG. 7 is a block diagram illustrating integration with OSS/BSS systems via an ESB according to one embodiment of the present invention.

FIG. 7 is a block diagram illustrating integration with OSS/BSS systems via an ESB according to one embodiment of the present invention. In this example, the system includes the transport layer 501 and service layer 537 as described above. As described, the service layer 537 includes an SDP 538 with an enabler framework 538 in which a number of enablers 544-554 can be implemented as described above. Also as shown here, one or more custom enablers 650 can be implemented as noted above.

The service layer 537 can include applications for providing or supporting VoIP services 556, a virtual PBX 558, a telephony application server (not shown here but can be considered as a environment where the services or PBX and VoIP can be composed at will to create new applications), etc. The service layer 537 can also include applications for supporting or providing multimedia messaging services 663, one or more custom services 660, ISV services 662, identity management 680, etc. As noted above, a SOA suite 562 can be implemented in the service layer. The SOA suite 562 can provide services based on a set of rules 671 applied to messages to, from, or within the service layer 537. A portal (e.g. Oracle web center) 675 can be provided as an interface to the SOA suite 562 and/or rules 671.

The SOA suite 562 can include and/or be coupled with an ESB (Enterprise Service bus) 682. The ESB 682 can also be coupled with Business Support Systems 686 and Operation Support Systems 690. According to one embodiment, the ESB 682 can be implemented as an Event Driven Architecture (EDA) as described, for example, in U.S. patent application Ser. No. 12/045,220 filed Mar. 10, 2008 by Maes and entitled "Presence-Based Event Driven Architecture" the entire disclosure of which is incorporated herein by reference for all purposes.

Accordingly, the SOA 562 can be integrated with a global data model to maintain context and message transformation to and from each OSS, BSS and SDP component and provide for global processes that can be driven across the overall system with functions or part of processes delegated to the different OSS, BSS and SDP components. Each component can further delegate/compose other components. Such an approach allows for productized/pre-packaged business process, ease of customization, introduction of new processes, ease of integration even with legacy OSS and BSS components, and migration towards a product stack.

According to one embodiment, identity management services 680 can provide a logical, unified profile for subscriber and user Identity Management throughout the service layer 537 with support for single sign-on, identity management and federation across the service layer 537, network identities that can span multiple network technologies, OSS and BSS identities (and BSS sharing across access networks), third party service providers, identity and subscription provisioning and life cycle management, delegation of subscription management to OSS/BSS via SOA.

As noted above, the embodiments of the present invention propose to look at the IMS differently. That is, IMS can be considered to be Internet (IP Network) plus a set of useful features for consumers 695 and 696 or Communications Service Providers. These functions can include, for example, Charging, Security (Access control, Authentication, Firewall, etc.), Subscription Management, Policy enforcement, QoS, Logging, Support for specific Telco Services (e.g. Voice). The functions that matter may vary based on what the service provider wants to achieve and what are the dependencies on the network of the applications that the service provider wants to provide. The Internet or other IP network plus these Telco functions allows development of multimedia services as on the IMS. Indeed and as a particular and preferred embodiment, a SDP implemented according to the embodiments described above can provide the same services that can be developed and deployed on any network providing the required capabilities. This is the case of the IMS, Internet plus Telco functions or on legacy networks (PSTN, etc.).

Additionally or alternatively, services like presence, IM, VoIP, PBX, IPTV, video chat, multimedia real-time communications, conferencing, etc. can be implemented by various custom and/or standard enablers of the enabler framework 540 of the SDP 538 as described herein. Other enablers that are contemplated and considered to be within the scope of the present invention include but are not limited to a call control enabler as described in U.S. patent application Ser. No. 11/949,930 filed Dec. 4, 2007 by Maes and entitled "Call Control Enabler Abstracted from Underlying Network Technologies", a media server control enabler as described in U.S. patent application Ser. No. 11/877,129 filed Oct. 23, 2007 by Maes and entitled "Network Agnostic Media Server Control Enabler", an intelligent messaging enabler as described in U.S. patent application Ser. No. 11/939,705 filed Nov. 14, 2007 by Maes and entitled "Intelligent Message Processing" of which the entire disclosure of each is incorporated herein by reference for all purposes. As described in the referenced applications and herein, these enablers can operate on different networks with possibly different underlying technologies while abstracting that technologies to the applications utilizing the functions provided by those enablers.

Therefore, a service platform like SDP can be used to develop/deploy services across different networks. In such a system, a recipe can be followed to pragmatically deploy IMS IP Multimedia services on Internet network plus relevant Telco functions as needed by services. IMS can then be migrated to when/if desired by the operator. Following such approach provides the possibility to offer IMS services immediately without IMS cost. Additionally, modular and incremental approaches can be implemented instead of a hard-coded, monolithic architecture and viable business models and deployments (pay for deployment, validate, coexist with legacy) can be implemented. Embodiments of the present invention thus bring internet technologies, capabilities and business models to IMS.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for providing communication services, the system comprising:

a communication network, wherein the communication network is a non-IP Multimedia Subsystem (IMS) network;

one or more subsystems executing on a Service Delivery Platform (SDP) communicatively coupled with the non-IMS network the one or more subsystems of the SDP providing one or more telco functions over the non-IMS network, wherein the one or more subsystems are further adapted to provide one or more IMS services over the non-IMS network, wherein the one or more subsystems comprise a platform adapted to provide an abstraction of the non-IMS network and other resources, wherein the one or more subsystems provide the one or more IMS services but are not an IMS architecture implementation and wherein the platform is not an IMS architecture implementation; and one or more application servers communicatively coupled with the non-IMS network and executing one or more service level applications that utilize the telco functions and wherein the one or more applications are adapted to access the non-IMS network and resources through the one or more subsystems of the SDP independent of underlying technologies of the non-IMS network and resources.

2. The system of claim 1, wherein the one or more telco functions comprise a charging function.

3. The system of claim 1, wherein the one or more telco functions comprise security functions.

4. The system of claim 3, wherein the security functions comprises an access control function.

5. The system of claim 3, wherein the security functions comprises an authentication function.

6. The system of claim 3, wherein the security functions comprises a firewall.

7. The system of claim 1, wherein the one or more telco functions comprise a subscription management function.

8. The system of claim 1, wherein the one or more telco functions comprise a policy enforcement function.

9. The system of claim 1, wherein the one or more telco functions comprise a Quality of Service (QoS) management and enforcement function.

10. The system of claim 1, wherein the one or more telco functions comprise a logging function.

11. The system of claim 1, wherein the one or more telco functions comprise a presence service.

12. The system of claim 1, wherein the one or more services comprise a streaming media service.

13. The system of claim 1, wherein the one or more services comprise an IP television service.

14. The system of claim 1, wherein the one or more services comprise a multimedia messaging service.

15. The system of claim 1, wherein the one or more services comprise an instant messaging service.

16. The system of claim 1, wherein the one or more services comprise a telephony service.

17. The system of claim 16, wherein the communication non-IMS network comprises an Internet Protocol (IP) network.

18. The system of claim 1, wherein the one or more services comprise a presence service.

19. The system of claim 1, wherein the one or more services comprise a push-to-talk service.

20. The system of claim 1, wherein the one or more services comprise a conference service.

21. The system of claim 20, wherein the conference service comprises a voice conference service.

22. The system of claim 20, wherein the conference service comprises a multimedia conference service.

23. The system of claim 1, wherein the one or more services comprise a download service.

24. The system of claim 1, wherein the one or more services comprise an upload service.

25. The system of claim 1, wherein the platform is implemented as a Service Oriented Architecture.

26. The system of claim 1, wherein the platform comprises one or more enablers communicatively coupled with the non-IMS network, each enabler adapted to provide access to capabilities of the non-IMS network to the one or more applications independent of the non-IMS network.

27. The system of claim 26, wherein the enablers comprise one or more of a call control enabler, a media server control enabler, an intelligent messaging enabler, a presence enabler, a location enabler, a QoS management and enforcement enabler, a charging enabler, an authentication enabler, an identity management enabler, a policy enforcement enabler, a subscription management enabler, or a user profile enabler.

28. A method of providing communication services, the method comprising:

providing by a Service Delivery Platform (SDP) a first telco function over a non-IP Multimedia Subsystem (IMS) network;

providing by the SDP a second telco function over the non-IMS network; and providing by the SDP one or more IMS services over the non-IMS network, wherein the computer system is not an IMS architecture implementation, wherein the computer system provides the one or more IMS services without using an IMS architecture implementation, wherein the computer system provides an abstraction of the non-IMS network and other resource and wherein one or more service level applications access the first telco function, the second telco function, or the IMS services through the computer system independent of underlying technologies of the non-IMS network and other resources.

29. The method of claim 28, wherein the second telco function is provided at a time later than the first telco function.

30. The method of claim 29, wherein the second telco function is provided when needed by a service provided on the network.

31. The method of claim 28, wherein the one or more telco functions comprise one or more of charging, access control, authentication, a firewall, subscription management, policy enforcement, Quality of Service (QoS) enforcement, logging, or a presence service.

32. The method of claim 28, wherein the one or more services comprise one or more of a streaming media service, an IP television service, a multimedia messaging service, an instant messaging service, a telephony service, a presence service, a push-to-talk service, a conference service, or a download service.

33. The method of claim 28, wherein providing the one or more services with features as provided by IMS is performed instead of implementing IMS.

34. The method of claim 28, wherein providing the one or more services with features as provided by IMS is performed as part of a migration to an IMS deployment.

35. The method of claim 34, wherein the migration to an IMS deployment includes providing both services with features as provided by IMS and assuming the telco functions.

36. The method of claim 35, wherein the services with features as provided by IMS can migrate, coexist, or switch across a plurality of networks.

37. The method of claim 34, wherein providing the one or more services with features as provided by IMS is performed as a way to integrate the IMS deployment with a legacy network.

38. The method of claim 28, wherein providing the one or more services with features as provided by IMS is performed to test services prior to an IMS deployment.

39. The method of claim 28, wherein providing the one or more services with features as provided by IMS is performed to generate revenues to fund an IMS deployment.

* * * * *

UNITED STATES PATENT AND TRADEMARK OFFICE
CERTIFICATE OF CORRECTION

PATENT NO. : 8,401,022 B2  
APPLICATION NO. : 12/364642  
DATED : March 19, 2013  
INVENTOR(S) : Maes et al.

Page 1 of 1

It is certified that error appears in the above-identified patent and that said Letters Patent is hereby corrected as shown below:

In the Specification:

In column 1, line 59, delete "1N" and insert -- IN --, therefor.

In column 5, line 58, delete "and or" and insert -- and/or --, therefor.

In column 5, line 66, delete "an a" and insert -- a --, therefor.

In column 8, line 40, delete "and or" and insert -- and/or --, therefor.

In column 11, line 3, delete "that that" and insert -- that --, therefor.

In column 11, line 57, delete "330" and insert -- 330, --, therefor.

Signed and Sealed this
Second Day of July, 2013

Teresa Stanek Rea
*Acting Director of the United States Patent and Trademark Office*